US012027332B2

(12) United States Patent
Hoffmann et al.

(10) Patent No.: US 12,027,332 B2
(45) Date of Patent: Jul. 2, 2024

(54) SWITCHING DEVICE WITH ROTARY CONTACT BRIDGE

(71) Applicant: TDK Electronics AG, Munich (DE)

(72) Inventors: Robert Hoffmann, Berlin (DE); Robert Minkwitz, Berlin (DE)

(73) Assignee: TDK Electronics AG, Munich (DE)

( * ) Notice: Subject to any disclaimer, the term of this patent is extended or adjusted under 35 U.S.C. 154(b) by 202 days.

(21) Appl. No.: 17/636,976

(22) PCT Filed: Sep. 1, 2020

(86) PCT No.: PCT/EP2020/074351

§ 371 (c)(1),
(2) Date: Feb. 21, 2022

(87) PCT Pub. No.: WO2021/063616

PCT Pub. Date: Apr. 8, 2021

(65) Prior Publication Data

US 2022/0293380 A1 Sep. 15, 2022

(30) Foreign Application Priority Data

Sep. 30, 2019 (DE) ......................... 102019126351.4

(51) Int. Cl.
*H01H 50/54* (2006.01)
*H01H 50/02* (2006.01)
*H01H 50/16* (2006.01)

(52) U.S. Cl.
CPC ........ *H01H 50/546* (2013.01); *H01H 50/023* (2013.01); *H01H 50/16* (2013.01)

(58) Field of Classification Search
CPC ..... H01H 50/546; H01H 50/023; H01H 50/16
See application file for complete search history.

(56) References Cited

U.S. PATENT DOCUMENTS 2,775,666 A 12/1956 Lazich
2,952,755 A 9/1960 Brinker et al.
3,008,070 A 11/1961 Nemeth
3,194,918 A * 7/1965 Muscante ............ H01H 1/2041 335/202
4,357,508 A 11/1982 Werner
5,519,370 A 5/1996 Perreira et al.
7,728,395 B2 6/2010 Yang et al.
(Continued)

FOREIGN PATENT DOCUMENTS

CN 104916462 A 9/2015
DE 451670 C 10/1927
(Continued)

*Primary Examiner* — Bernard Rojas
(74) *Attorney, Agent, or Firm* — Slater Matsil, LLP

(57) ABSTRACT

In an embodiment a switching device includes two fixed contacts and a rotary contact bridge in a switching chamber in a gas-tight region, wherein the rotary contact bridge is rotatable about an rotation axis, wherein, in a first switching state, the fixed contacts are electrically conductively connected by the rotary contact bridge, wherein, in a second switching state, the rotary contact bridge is rotatable about the rotation axis relative to the first switching state, and the fixed contacts are electrically insulated from one another, and wherein the gas-tight region includes $H_2$.

20 Claims, 6 Drawing Sheets

(56) References Cited

U.S. PATENT DOCUMENTS

| | | | | |
|---|---|---|---|---|
| 8,130,064 | B2 * | 3/2012 | Moeller | H01H 50/641<br>335/131 |
| 8,514,037 | B2 | 8/2013 | Hsu et al. | |
| 9,293,271 | B2 | 3/2016 | Biedunkiewicz et al. | |
| 2008/0122562 | A1 * | 5/2008 | Bush | H01H 51/27<br>335/151 |
| 2009/0114622 | A1 * | 5/2009 | Bush | H01H 50/023<br>335/152 |
| 2010/0108484 | A1 | 5/2010 | Soukup | |
| 2013/0105444 | A1 | 5/2013 | Prohaska et al. | |
| 2014/0110376 | A1 | 4/2014 | Zahlmann et al. | |
| 2020/0402732 | A1 | 12/2020 | Hoffman et al. | |

FOREIGN PATENT DOCUMENTS

| | | | |
|---|---|---|---|
| DE | 102012000441 | A1 | 7/2012 |
| DE | 102011118713 | A1 | 9/2012 |
| DE | 102018104415 | A1 | 8/2019 |
| KR | 20050120066 | A | 12/2005 |
| WO | 9524051 | A1 | 9/1995 |

* cited by examiner

SWITCHING DEVICE WITH ROTARY CONTACT BRIDGE

This patent application is a national phase filing under section 371 of PCT/EP2020/074351, filed Sep. 1, 2020, which claims the priority of German patent application 102019126351.4, filed Sep. 30, 2019, each of which is incorporated herein by reference in its entirety.

TECHNICAL FIELD

A switching device is specified.

BACKGROUND

The switching device is embodied, in particular, as a remotely actuated, electromagnetically acting switch, which can be operated by an electrically conductive current. The switching device can be activated by a control circuit and can switch a load circuit. In particular, the switching device can be designed as a relay or as a contactor, in particular as a power contactor. Particularly preferably, the switching device can be designed as a gas-filled power contactor.

One possible application of such switching devices, in particular of power contactors, is the opening and isolation of battery circuits, for example in motor vehicles such as electrically or partially electrically operated motor vehicles. These can be purely battery operated vehicles (BEV: battery electric vehicle), hybrid electric vehicles which can be charged via an outlet or charging station (PHEV: plug-in hybrid electric vehicle) and hybrid electric vehicles (HEV). In this case, both the positive and the negative contact of the battery are isolated with the aid of a power contactor. This disconnection takes place, for example, in a rest state of the vehicle in normal operation and also in the event of a disturbance such as an accident or the like. In this case, the task of the power contactor is to switch the vehicle to a de-energized state and to interrupt the current flow.

In conventional contactors, a movable contact bridge is raised and lowered for switching and thus electrically conductively connected with or separated from fixed main contacts by a linear displacement. The load circuit can be connected to the main contacts. In particular, when the contacts are opened under load, a switching are usually forms between the fixed contacts and the contact bridge. To prevent damage and so-called sticking of the contacts, i.e. permanent adhesion of the contact bridge to one or both fixed contacts, it is important to prevent the switching arcs that occur when the contacts are opened and closed, or at least to extinguish them as quickly as possible. The decisive factor here is the switching capacity of the switching device: the higher the voltage applied and the higher the current flowing, the more difficult it is to extinguish arcs that occur. The larger the opening gap between the contact bridge and the fixed contacts becomes when the contact bridge is lowered, the easier it is to extinguish a switching arc. Therefore, the opening gap cannot be selected to be arbitrarily small, which, for example, applies limits in terms of reducing the size of the contactor.

SUMMARY OF THE INVENTION

Embodiments provide a switching device.

According to at least one embodiment, a switching device comprises at least one fixed contact and at least one rotary contact bridge. The at least one fixed contact and the at least one rotary contact bridge are provided and embodied to switch on and off a load circuit connectable to the switching device. Particularly preferably, the switching device comprises at least two fixed contacts which are arranged separately from one another in the switching device and to which the load circuit can be connected. The fixed contacts and the rotary contact bridge can also be subsumed in the following briefly under the terms "contacts" or "switching contacts".

The rotary contact bridge can be rotated about a rotation axis and is thus embodied as a rotatable contact. The rotary contact bridge is rotatable in the switching device in such a way that the rotary contact bridge can change between a first switching state and a second switching state. In the first switching state, which is an interconnecting state of the switching device, the fixed contacts are electrically conductively connected to each other by the rotary contact bridge so that the current of a connected load circuit can flow through the switching device and, in particular, through the fixed contacts and the rotary contact bridge. For example, a pair of two fixed contacts can be electrically conductively connected to each other in this manner. However, it may also be possible for more than two fixed contacts to be electrically conductively connected to each other in the first switching state. In the second switching state, which is a non-interconnecting state of the switching device and in which the rotary contact bridge is rotated about the rotation axis relative to the first switching state, the fixed contacts are electrically separated from each other. The first and second switching states can also be referred to as the first and second states for short in the following. Particularly preferably, the fixed contacts in the first state are in mechanical contact with the rotary contact bridge and are thus galvanically connected with the latter, while the fixed contacts in the second state are mechanically and thus also galvanically separated from the rotary contact bridge. In particular, it is possible to switch between the first and second switching states by rotating the rotary contact bridge through an angle greater than or equal to 10° and less than or equal to 170°, for example 90°.

According to a further embodiment, the rotary contact bridge comprises an electrically conductive element that takes on a galvanically conductive position in the first switching state, thereby contacting the fixed contacts and thereby producing an electrical connection between the fixed contacts. The electrically conductive element comprises a contact piece on a side facing away from the rotation axis in the radial direction for contacting each of the fixed contacts. In the first switching state, each of the contact pieces of the electrically conductive element is in mechanical contact with a contact surface of a contact region of a fixed contact. In the second switching state, the rotary contact bridge is rotated relative to the first switching state such that the contact pieces are galvanically separated from the fixed contacts.

The at least one fixed contact and/or at least the electrically conductive element of the rotary contact bridge may be, for example, with or of Cu, a Cu alloy, one or more refractory metals such as, for example, W, Ni and/or Cr, or a mixture of said materials, for example of copper with at least one further metal, for example W, Ni and/or Cr. Furthermore, composite materials comprising metal oxide particles in a metal matrix are also conceivable. Particularly preferably, such a composite material comprises or is made of alumina particles in a copper matrix.

According to a further embodiment, the switching device comprises a housing in which the rotary contact bridge and the at least one fixed contact or the at least two fixed contacts are arranged. In particular, the rotary contact bridge may be arranged completely in the housing. The fact that a fixed contact is arranged in the housing can in particular mean that at least one contact region of the fixed contact and in particular a contact surface of the contact region, which is in mechanical contact with the rotary contact bridge in the interconnecting state, is arranged inside the housing. For connecting a supply line of a load circuit to be switched by the switching device, a fixed contact arranged in the housing can be electrically contacted from outside, i.e. from outside the housing. For this purpose, a fixed contact arranged in the housing can protrude with a part from the housing and comprise a connection possibility for a supply line outside the housing.

According to a further embodiment, the switching device comprises a switching chamber in which the rotary contact bridge and the at least one fixed contact or the at least two fixed contacts are arranged. The switching chamber may in particular be arranged in the housing. The rotary contact bridge can particularly preferably be arranged completely in the switching chamber. The fact that a fixed contact is arranged in the switching chamber can in particular mean that at least one contact region of the fixed contact, and in particular a contact surface of the contact region which is in mechanical contact with the rotary contact bridge in the interconnecting state, is arranged within the switching chamber. For connecting a supply line of a load circuit to be switched by the switching device, a fixed contact arranged in the switching chamber can be electrically contacted from outside, i.e. from outside the switching chamber. For this purpose, a fixed contact arranged in the switching chamber can protrude with a part from the switching chamber and comprise a connection possibility for a supply line outside the switching chamber.

According to a further embodiment, the switching device comprises a drive unit by means of which the rotary contact bridge can be rotated to change the switching state. For this purpose, the switching device can comprise a shaft that is connected at one end with the rotary contact bridge in such a way that the rotary contact bridge can be moved by means of the shaft, i.e. it is also rotated by the shaft when the latter is rotated. The shaft thus particularly preferably defines the rotation axis of the rotary contact bridge, so that in the following the term “shaft” can also denote the “rotation axis”. The rotary contact bridge is particularly preferably attached to the shaft. In particular, the rotary contact bridge may be attached to the shaft in an electrically insulated manner. For example, an electrically insulating material may be arranged between the shaft and the electrically conductive parts of the rotary contact bridge. In particular, the shaft may extend into the switching chamber through an opening in the switching chamber. In particular, the switching chamber may comprise a switching chamber base that comprises an opening through which the shaft protrudes. The drive unit is preferably arranged outside the switching chamber and is provided and configured to rotate the shaft and thus the rotary contact bridge connected with the shaft. The drive unit and at least part of the shaft or even the entire shaft may thus form the drive system for rotating the rotary contact bridge.

For example, the drive unit may comprise a stepper motor by which rotation through a defined angle can be affected in incremental steps. Further, the drive unit may comprise a solenoid drive comprising a rotatable magnetic armature rotatable by a magnetic circuit to affect the switching operations described above. For this purpose, the magnetic circuit may comprise a yoke. The rotatable magnetic armature may be connected with the yoke. For this purpose, the magnetic armature may comprise or be formed as a magnetic rotary core which may be attached to an end of the shaft opposite to the rotary contact bridge and which is part of the magnetic circuit. By means of a coil, which can be connected with a control circuit, a magnetic field can be generated in the magnetic circuit, by which the magnetic armature is rotated.

By means of the drive unit, the switching device can be switched from the second to the first switching state, for example. The rotational motion of the rotary contact bridge for switching from the first to the second switching state can also be affected by the drive unit or, preferably alternatively or additionally, by a return spring. In this way, it can be achieved that when a control current for switching the switching device to the first switching state is discontinued, the switching device automatically changes to the second switching state and thus interrupts the load circuit.

According to a further embodiment, the drive system continues to rotate through a predetermined angle after the first switching state is reached. This means that the drive unit or the drive unit and at least part of the shaft or also the drive unit and the shaft can continue to rotate through a predetermined angle when switching to the first switching state after the first switching state has been reached, i.e. when the electrically conductive element of the rotary contact bridge is in galvanically conductive contact with the fixed contacts. The predetermined angle may particularly preferably be greater than or equal to 1° and less than or equal to 15°. For example, the rotary contact bridge may be attached to the shaft by means of a corresponding rotational tolerance or elastic attachment such that the shaft can rotate further than the rotary contact bridge. With other words, the drive system can “over-rotate” when switching to the first state. In this way, it can be achieved that the drive system, i.e. the drive unit or the drive unit and at least a part of the shaft or even the drive unit and the shaft, can already perform a rotational motion at the start of switching to the second operating state before the rotational contact bridge and in particular the electrically conductive element of the rotational contact bridge starts to rotate. As a result, the drive system can pick up speed and an angular momentum can be generated, so that it can be achieved that the fixed contacts can be electrically separated from each other more quickly after transmission of this angular momentum to the rotary contact bridge.

The shaft may preferably comprise or be made of stainless steel. The switching chamber, i.e. in particular the switching chamber wall and/or the switching chamber base, can at least partially preferably comprise or be made of a metal oxide ceramic such as for example $Al_2O_3$ or a plastic. Suitable plastics are in particular those with a sufficient temperature resistance. For example, the switching chamber may comprise polyetheretherketone (PEEK), a polyethylene (PE), and/or glass-filled polybutylene terephthalate (PBT) as the plastic. Furthermore, the switching chamber may also comprise, at least in part, a polyoxymethylene (POM), in particular with the structure $(CH_2O)_n$.

According to a further embodiment, the contacts are arranged in a gas atmosphere. In particular, this can mean that the rotary contact bridge is arranged completely in the gas atmosphere and that further at least a part of the at least one fixed contact, such as the contact region of the at least one fixed contact, is arranged in the gas atmosphere. For this purpose, the switching device may comprise a gas-tight region in which the gas atmosphere is kept hermetically sealed from the environment and in which the described components may be arranged. The gas-tight region may be formed by parts of the housing and/or by additional walls and/or by components within the housing. For example, the gas-tight region may be formed by parts of the switching chamber wall and, if applicable, a yoke, and in combination with additional wall components, for example with or made of pure iron, aluminum or stainless steel. In particular, the switching chamber may be arranged in or form a part of the gas-tight region of the switching device. Furthermore, the drive unit can also be arranged partially or preferably completely within the gas-tight region. Accordingly, the switching device may particularly preferably be a gas-filled switching device such as a gas-filled contactor. By increasing the are voltage, the gas atmosphere may in particular promote extinction of arcs that may occur between contacts during switching operations. The gas of the gas atmosphere may preferably comprise $H_2$ and particularly preferably comprise at least 50% $H_2$. In addition to hydrogen, the gas may comprise an inert gas, particularly preferably $N_2$ and/or one or more noble gases. Furthermore, in particular, the gas, i.e. at least part of the gas atmosphere, may be located in the switching chamber.

According to a further embodiment, the switching chamber comprises a cylindrical switching chamber wall and the fixed contacts protrude through the switching chamber wall into the switching chamber. That the switching chamber wall is cylindrical may in particular mean that the shape of the switching chamber wall comprises or is at least derived from a cylindrical-shell shape, wherein the cylindrical shell comprises a circular cross-sectional area. In particular, the cylindrical-shell shape comprises a cylinder axis that coincides with the rotation axis. The switching chamber wall may additionally comprise recesses and/or bulges in or on an inner wall facing the rotary contact bridge and/or an outer wall facing away from the inner wall. Particularly preferably, the fixed contacts in the switching chamber wall can be aligned radially with respect to the rotation axis, wherein two fixed contacts to be connected by the rotary contact bridge are preferably arranged opposite one another in the radial direction. The fixed contacts can each comprise a contact region with a contact surface facing the rotary contact bridge. At least a part of the contact regions or at least a part of the contact surface of each of the fixed contacts may project beyond the inner wall.

According to a further embodiment, each of the fixed contacts comprises a beveled contact surface facing the rotary contact bridge. In particular, a "beveled contact surface" may mean that the contact region is not arranged tangentially to the rotational motion of the rotary contact bridge and thus is not arranged tangentially to the inner wall of the switching chamber wall. In this case, the contact surfaces can be beveled on one or more sides. By beveling the contact regions, the mechanical contact to the rotary contact bridge can be improved. Furthermore, the contact surfaces can be beveled in such a way that the contact surfaces counteract a rotational motion of the rotary contact bridge in one direction, so that it can be prevented that the rotary contact bridge continues to rotate beyond the first state when rotating from the second to the first state.

According to a further embodiment, the rotary contact bridge is spaced from the inner wall of the switching chamber wall. Particularly preferably, the rotary contact bridge is spaced from the inner wall of the switching chamber wall in each switching state as well as during switching from the first to the second switching state and vice versa. For example, the inner wall of the switching chamber wall may comprise a diameter larger than the largest dimension of the rotary contact bridge perpendicular to the rotation axis. For example, the inner wall of the switching chamber wall may comprise an increased diameter at least in the region of the rotary contact bridge. Particularly preferably, the fixed contacts can be arranged for this purpose in a groove in the inner wall at least partially surrounding the rotary contact bridge. A gap can thus be present between the rotary contact bridge and the inner wall of the switching chamber wall, at least in the radial direction. The narrower the gap, the easier it is to extinguish switching arcs occurring during switching, since there is less space for the switching arcs to propagate.

According to a further embodiment, the rotary contact bridge comprises spring-mounted contact pieces. In particular, the rotary contact bridge may comprise a middle part attached to the shaft. The contact pieces can be arranged on this with spring elements arranged therebetween. The middle part, the spring elements and the contact pieces can be formed in one piece or can be formed from separately manufactured parts that are joined together to form the electrically conductive element. When the contact surfaces of the fixed contacts are contacted during switching to the first switching state, the spring-mounted contact pieces can be pressed in the direction towards the rotation axis so that an increased contact pressure can be achieved by the spring elements. This can make it possible for a secure and permanent contact between the contact pieces and the fixed contacts to be enabled in the first switching state. When switching from the first to the second switching state, the spring elements can relax again and press the contact pieces away from the middle part in the radial direction. Particularly preferably, the contact pieces still comprise a distance to the inner wall of the switching chamber wall in the relaxed state of the spring elements.

According to a further embodiment, the rotary contact bridge comprises at least one insulator element comprising or being made of an electrically insulating material. Preferably, the electrically conductive element of the rotary contact bridge is at least partially surrounded by the insulator element. For example, the insulator element may form part of a disk. There may also be a plurality of insulator elements. Thus, for example, the rotary contact bridge may be substantially formed as a disk by the electrically conductive element and the at least one insulator element, wherein the contact pieces may protrude from the disk in a radial direction. Particularly preferably, the electrically conductive element is enclosed by the at least one insulator element except for a part of the contact pieces, so that the electrically conductive element is embedded in the at least one insulator element.

According to a further embodiment, the switching device comprises two secondary contacts in the form of auxiliary contacts which, in the second switching state, are electrically conductively connected to one another by the rotary contact bridge. In the first switching state, on the other hand, the auxiliary contacts are electrically separated from each other. For example, by measuring the electrical resistance, a voltage drop or an auxiliary current flow through the auxiliary contacts, it can be determined whether the switching device is in the second switching state or whether, for example, sticking of the contacts has occurred and the rotary contact bridge can no longer rotate from the first to the second state. Furthermore, it may also be possible for a further electrically conductive element, which may also be referred to as an electrically conductive auxiliary element, to be present in the rotary contact bridge by means of which the auxiliary contacts are electrically conductively connected to one another in either the first or the second switching state. For example, the auxiliary contacts can thereby be switched at the same time as the fixed contacts and thus in parallel therewith. The features described for the electrically conductive element beforehand and in the following may also apply to the electrically conductive auxiliary element. Furthermore, features described beforehand and in the following for the fixed contacts may also apply to the auxiliary contacts. In particular, however, the auxiliary contacts may be dimensioned smaller than the fixed contacts, since the auxiliary contacts need not comprise the same current-carrying capacity as the fixed contacts.

According to a further embodiment, the switching device comprises a magnet, in particular a permanent magnet, above each of the fixed contacts along a direction parallel to the rotation axis. The magnets are preferably arranged outside the switching chamber, for example on the switching chamber or on the outside of the switching chamber. The magnets, which act as so-called quenching magnets, can generate a magnetic field in the region of the fixed contacts which, due to the Lorentz force, can lead to a prolongation of switching arcs and to an expulsion of the switching arcs from the regions between the contact surfaces of the fixed contacts and the contact pieces of the rotary contact bridge, which can facilitate quenching of the switching arcs.

According to a further embodiment, the switching device comprises a plurality of pairs of fixed contacts, each of which can be interconnected by an associated electrically conductive element in the rotary contact bridge. It may thus be possible to simultaneously interconnect or electrically disconnect multiple pairs of fixed contacts with a single rotational movement of the rotary contact bridge. If the rotary contact bridge comprises several electrically conductive elements, these are preferably arranged electrically insulated from one another in the rotary contact bridge by one or more insulator elements.

In the switching device described here, the switching operation is carried out, instead of a linear movement that is customary in the prior art, by means of a rotational movement, which can be affected, for example, by a stepper motor or a magnetic drive with a magnetic circuit with a coil drive as the drive unit. In the case of a stepper motor as the drive unit, the drive unit can comprise a high torque so that large restoring forces can also be overcome, for example by a strong restoring spring. In turn, a magnetic drive can be more cost-effective, for example.

In particular, it has been shown that a switching device described herein in the form of a gas-filled power contactor with a combination of the rotary contact bridge and a gas filling, i.e. a gas atmosphere favoring the quenching of arcs, in a switching chamber is advantageous, wherein the switching chamber is with or of a ceramic material or a plastic material described above. Particularly preferably, the switching device additionally comprises quenching magnets.

The rotary contact bridge can particularly preferably be embodied in such a way that the rotary contact bridge fills the switching chamber as completely as possible, so that there is only the narrowest possible gap between the inner wall of the switching chamber wall and the rotary contact bridge. Together with a wide opening path caused by the angle of rotation between the first and second switching states, rapid extinction of switching arcs can be favored. With respect to typical sizes of power contactors, for example, the distance between the electrically conductive parts can thus be increased from about 1 mm per fixed contact to, for example, about 10 mm or even several 10 mm, for example more than 20 mm, when the contactor is rotated through an angle of 90°. As a result, very high insulation voltages can be achieved.

The switching device described here further comprises the advantage that abrasion or deposits, as a result of disconnection processes at high voltage and high current, are deposited on opposite sides of the housing. A reduction in insulation resistance over the service life is thus less than with conventional contactors with a linear movement. The arrangement of the contacts with the main terminals, i.e. the fixed contacts, in the radial direction on the sides prevents contact lavitation, since there is no change in direction of the current flow as it passes through the switch. The design of the switching device described here is further largely immune to external vibration effects. In particular, there is no axis in which excitation could lead to unintended opening or closing of the contacts. Parallel contacts, for example auxiliary contacts or further fixed contacts, can be easily integrated and switched in parallel or alternately via further electrically conductive elements on the rotary contact bridge. In particular, soldering or other mounting can also be carried out in the switching chamber wall, which is possible due to the larger spacing of the fixed contacts. By separating the switching arcs on opposite sides in the radial direction, it is very unlikely that the arcs will collide. If, in addition, magnets are used as described above, a deflection of the foot points against the direction of rotation can always be achieved. A break-off of the arcs is thus considerably favored.

BRIEF DESCRIPTION OF THE DRAWINGS

Further advantages, advantageous embodiments and developments are revealed in the exemplary embodiments described below in association with the figures.

In the exemplary embodiments and figures, identical, similar or identically acting elements may each be denoted by the same reference signs. The elements illustrated and their mutual proportions should not be considered true to scale; instead, individual elements, for example layers, components, structural elements and regions, may be shown exaggerated in size for better illustration and/or for better understanding.

DETAILED DESCRIPTION OF ILLUSTRATIVE EMBODIMENTS

Figure 1A:
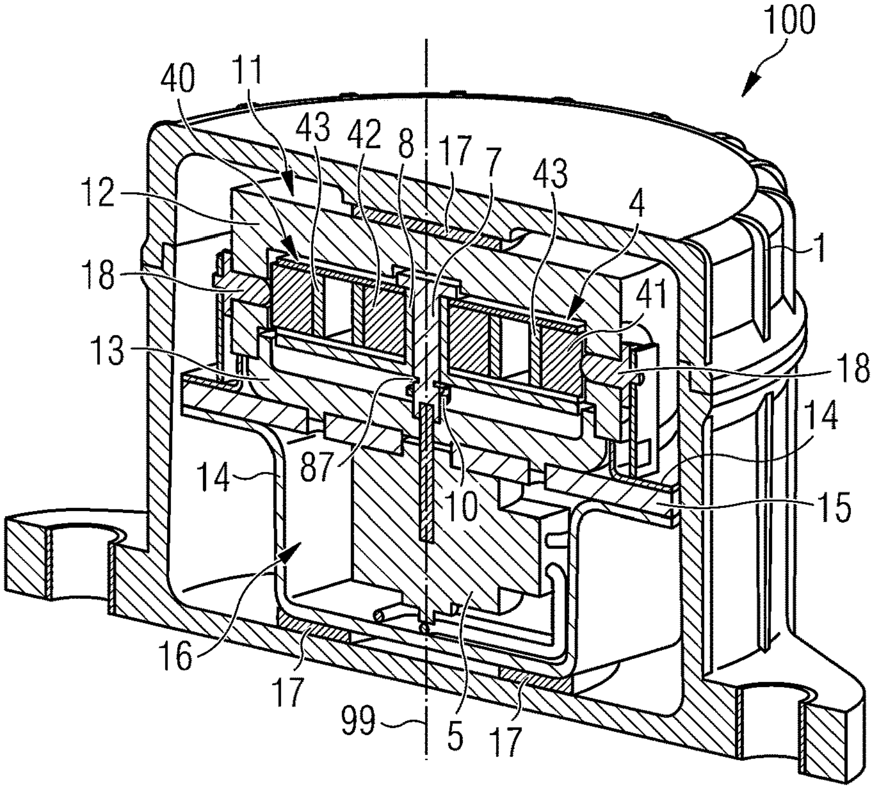
FIGS. 1A to 1I show schematic illustrations of a switching device according to an exemplary embodiment.
Figure 1B:
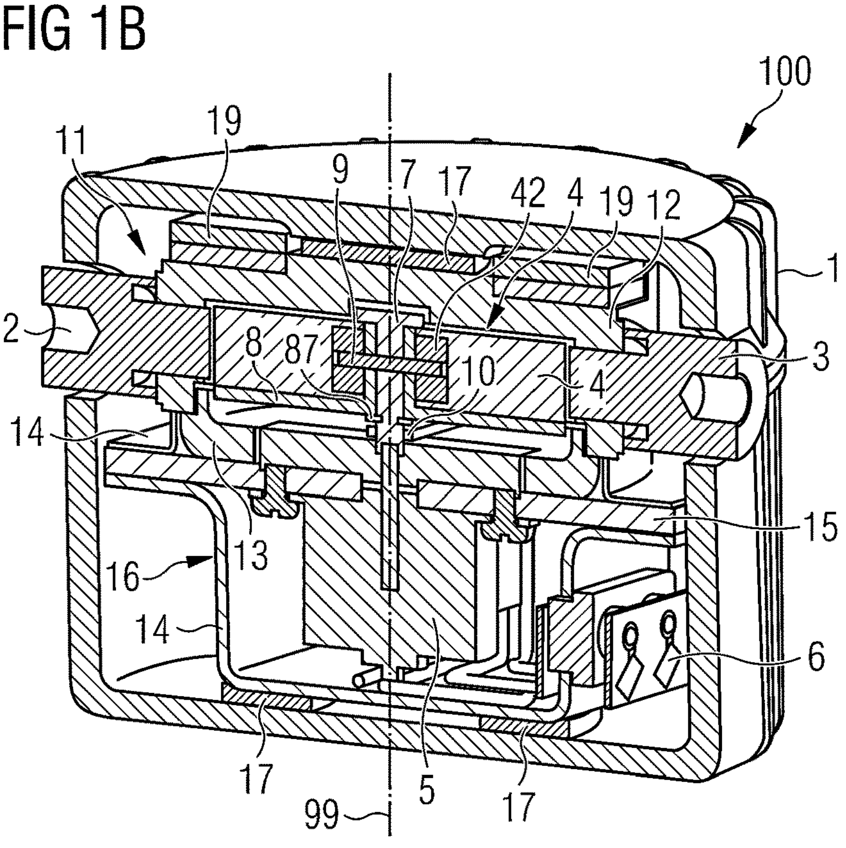
Figure 1C:
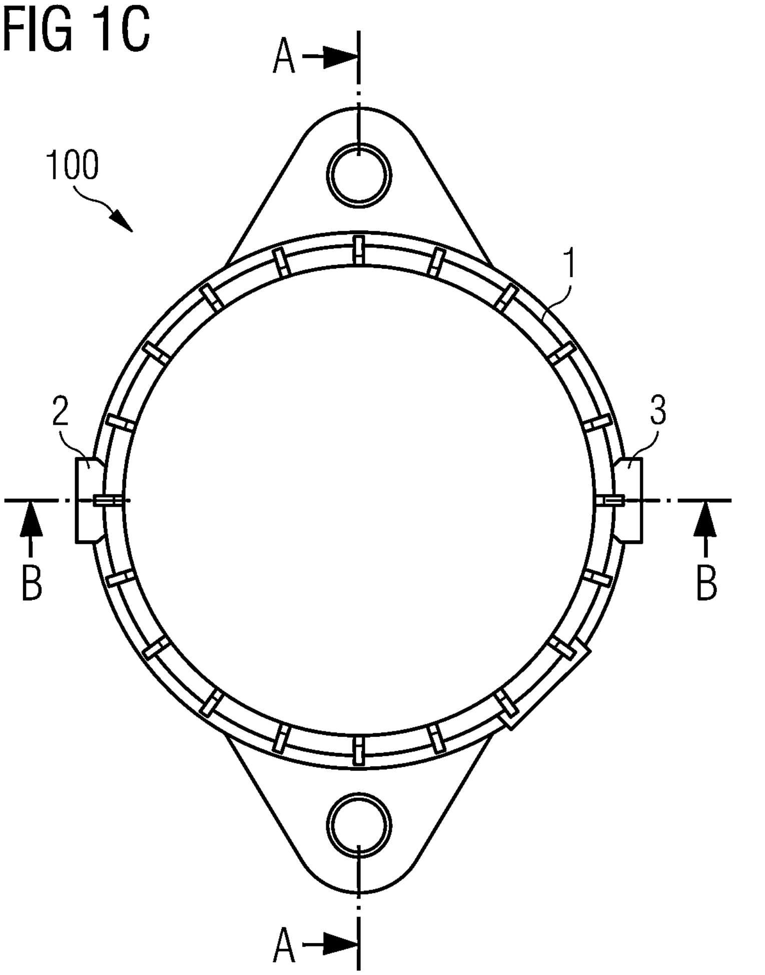
Figure 1D:
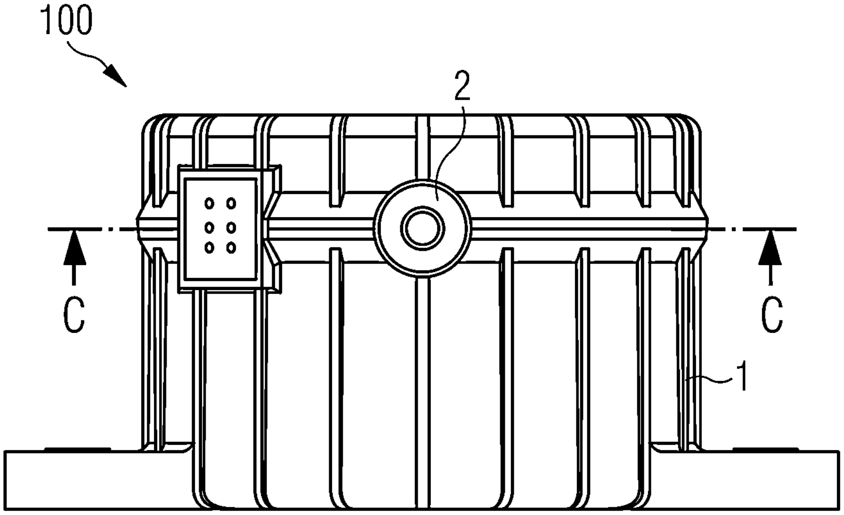
Figure 1E:
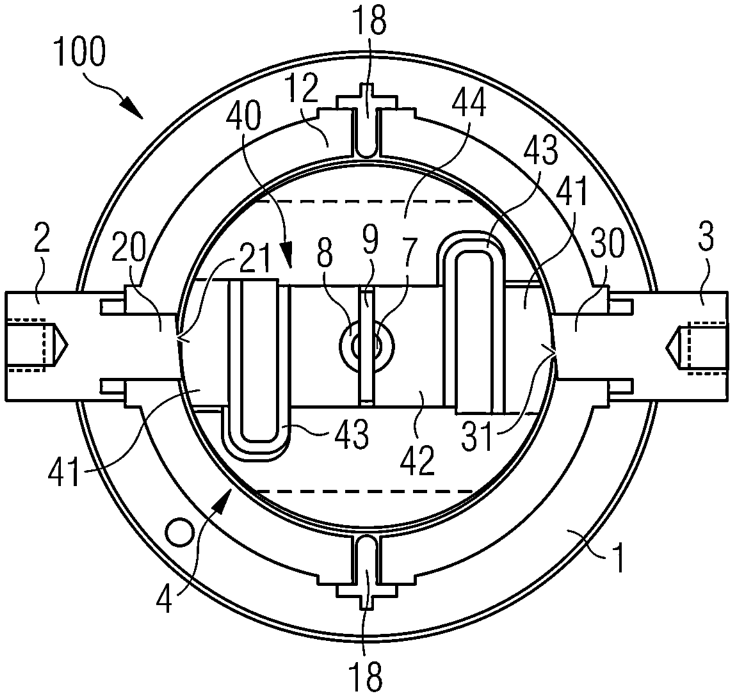
Figure 1F:
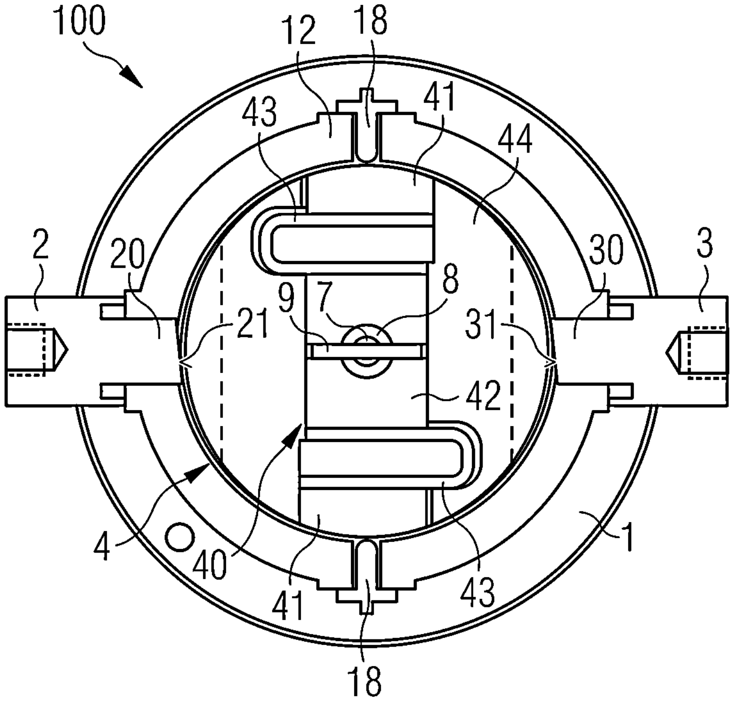
Figure 1G:
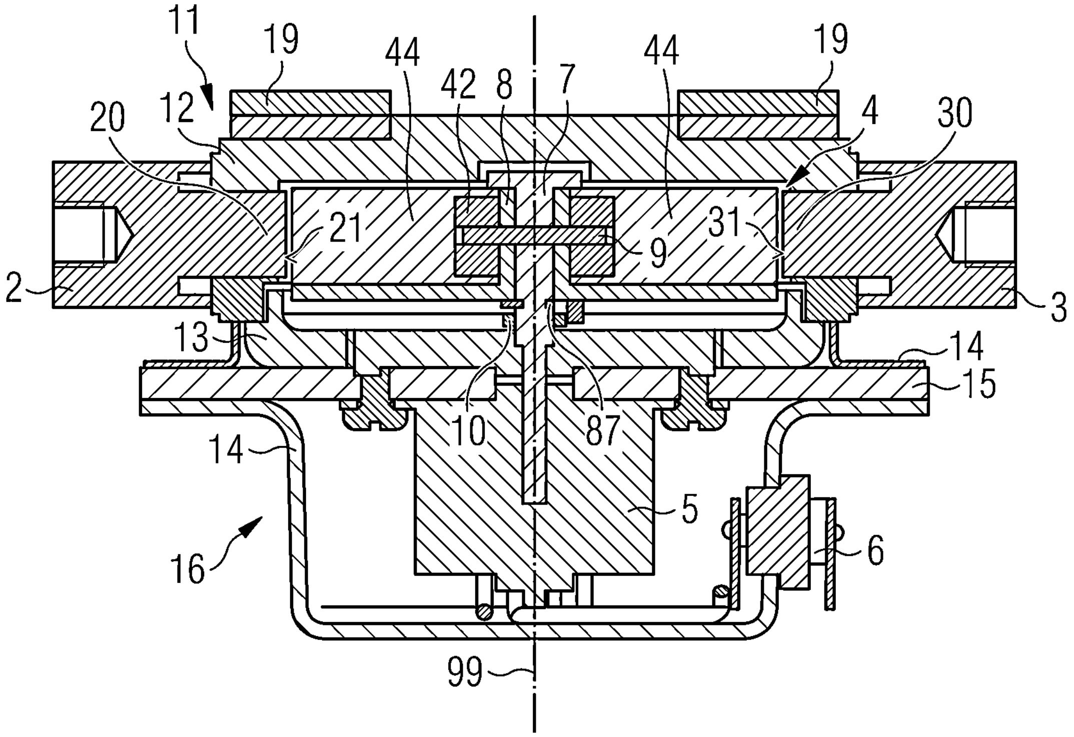
Figure 1H:
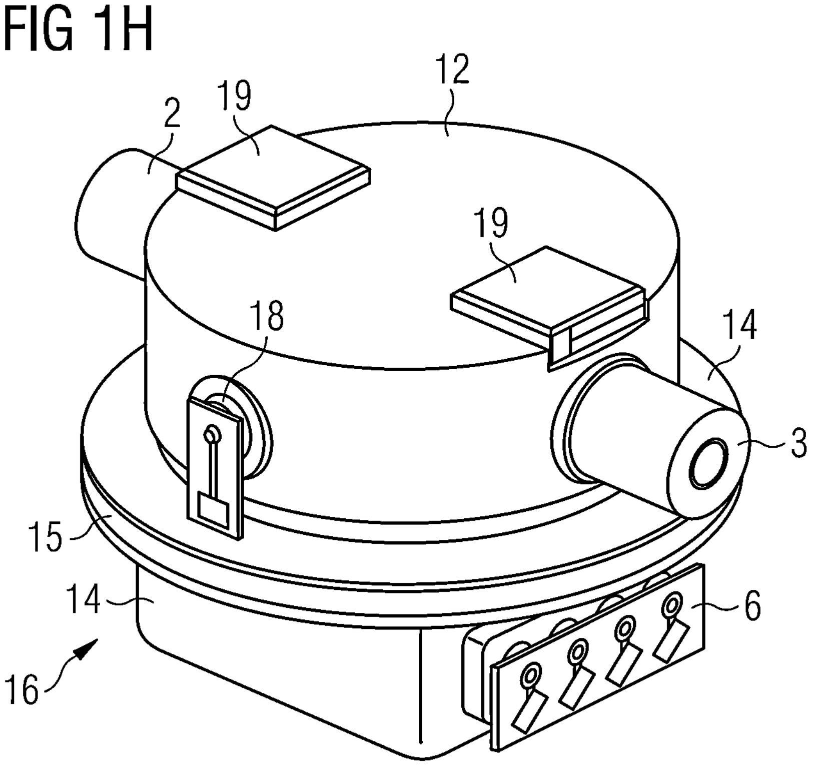
Figure 1I:
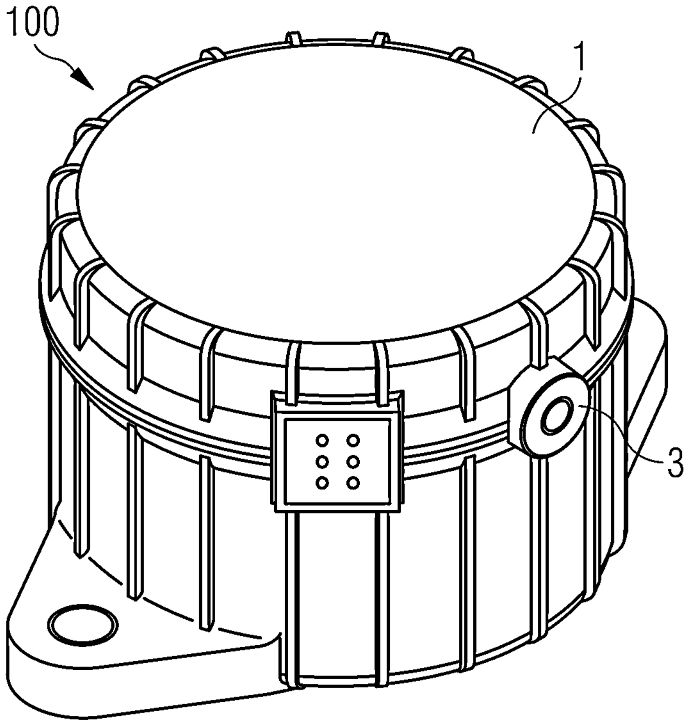

FIGS. 1A to 1I show an exemplary embodiment of a switching device 100 that may be used, for example, for switching high electric currents and/or high electric voltages of a load circuit connectable to the switching device 100 and that may be a relay or contactor, in particular a power contactor. FIGS. 1A and 1B show three-dimensional sectional views of the switching device 100, while FIGS. 1C and 1D show exterior views of the switching device 100 in a top view and a side view, respectively. The sectional view shown in FIG. 1A corresponds to the sectional plane AA indicated in FIG. 1C, while the sectional view shown in FIG. 1B corresponds to the sectional plane BB shown in FIG. 1C. FIGS. 1E and 1F show sectional views of the switching device 100 along the sectional plane CC indicated in FIG. 1D and thus with a viewing direction along the rotation axis 99 indicated in FIGS. 1A, 1B, and 1G, wherein the switching device 100 is shown in a first switching state in FIGS. 1E and 1*n* a second switching state in FIG. 1F, as also shown in FIGS. 1A, 1B, and 1G. In FIG. 1G, the gas-tight region 16 of the switching device 100 is shown in a sectional view corresponding to the sectional plane BB, which corresponds substantially to the switching device 100 without the housing 1. FIGS. 1H and 1I show in three-dimensional views substantially the gas-tight region 16 and thus the switching device 100 without housing 1, as well as an external view of the switching device 100. The following description refers equally to FIGS. 1A to 1I. The geometries shown are to be understood as exemplary and non-limiting only, and may also be designed alternatively.

The switching device 100 comprises two fixed contacts 2, 3 and a rotary contact bridge 4. A load circuit can be connected to the fixed contacts 2, 3, which are arranged separately from one another in the switching device 100. The fixed contacts 2, 3 together with the rotary contact bridge 4 as a rotatable contact form the switching contacts.

The switching contacts and the other components described in the following are arranged in a housing 1. The housing 1 serves primarily as contact protection for the components arranged inside and comprises or is made of a plastic, for example PBT or glass-filled PBT.

The rotary contact bridge 4 forms a contact rotatable about an rotation axis 99 and is rotatable in the switching device 100 such that the rotary contact bridge 4 can switch between the first switching state shown in FIG. 1E and the second switching state shown in FIG. 1F as also shown in FIGS. 1A, 1B and 1G. Thus, the switching activity of the switching device 100 is substantially performed by the rotary contact bridge 4. In the first switching state, which is an interconnecting state of the switching device 100, the fixed contacts 2, 3 are electrically conductively connected to each other by the rotary contact bridge 4 so that the current of a connected load circuit can flow through the switching device 100 and in particular through the fixed contacts 2, 3 and the rotary contact bridge 4. In the second switching state, which is a non-interconnecting state of the switching device 100 and in which the rotary contact bridge is rotated by an angle about the rotation axis 99 relative to the first switching state, the fixed contacts 2, 3 are electrically insulated from one another. As can be seen in FIG. 1E, in the first switching state the fixed contacts 2, 3 are in mechanical contact with the rotary contact bridge 4 and are thus galvanically connected with it, while in the second switching state the fixed contacts 2, 3 are mechanically and thus also galvanically separated from the rotary contact bridge 4. As shown, it is possible, for example, to switch between the first and second switching states by rotating the rotary contact bridge 4 through an angle of 90°. Alternatively, other configurations are possible in which switching between the switching states can be accomplished by rotating the rotary contact bridge 4 through an angle greater than or equal to 10° and less than or equal to 170° such as 10°, 15°, 30°, 45°, or multiples thereof.

The rotary contact bridge 4 comprises an electrically conductive element 40 which contacts the fixed contacts 2, 3 in the first switching state and establishes an electrical connection between the fixed contacts 2, 3. For contacting each of the fixed contacts 2, 3, the electrically conductive element 40 comprises a contact piece 41 on a side of the rotary contact bridge 4 facing away from the rotation axis 99 in the radial direction. In the first switching state, each of the contact pieces 41 of the electrically conductive element 40 is in mechanical contact with a contact surface 21, 31 of a contact region 20, 30 of a fixed contact 2, 3. In the second switching state, the rotary contact bridge 4 is rotated relative to the first switching state such that the contact pieces 41 are galvanically separated from the fixed contacts 2, 3.

The switching device 100 further comprises a drive unit 5 by means of which the rotary contact bridge 4 can be rotated for switching, i.e. for changing the switching state. In the exemplary embodiment shown, the drive unit 5 comprises or is configured as a motor, in particular a stepper motor. By means of a stepper motor, a rotation by a defined angle can be affected in incremental steps and a high torque can be provided. Alternatively, the drive unit can comprise a magnetic drive, as described below in connection with FIG. 2. For controlling the drive unit, there may be, for example, a connection element 6 and supply lines as shown.

Furthermore, the switching device 100 comprises a shaft 7 which is, for example, made of stainless steel or comprises stainless steel and which is connected at one end to the rotary contact bridge 4 in such a way that the rotary contact bridge 4 can be rotated by means of the shaft 7. At the opposite end, the shaft 7 is connected with the drive unit 5 such that the drive unit 5 can rotate the rotary contact bridge 4. The shaft 7 thus defines the rotation axis 99 of the rotary contact bridge 4. The rotary contact bridge 4 is particularly preferably attached to the shaft 7. In particular, the rotary contact bridge 4 may be attached to the shaft 7 in an electrically insulated manner. As shown, an electrically insulating material 8, in particular a plastic such as PBT or POM, can be arranged between the shaft 7 and the rotary contact bridge 4, in particular at least between the shaft 7 and electrically conductive parts of the rotary contact bridge 4. The attachment of the rotary contact bridge 4 to the shaft 7 can be carried out, as shown, for example by means of a pinned fitting 9. The electrically insulating material 8 can be additionally secured to the shaft 7, for example as shown, by a snap ring 87.

By means of the drive unit 5, the switching device 100 can be switched from the second to the first switching state, for example. The rotational motion of the rotary contact bridge 4 for switching from the first to the second switching state can also be affected by the drive unit 5 or, preferably alternatively or additionally, by a return spring 10. By means of the return spring 10, it can be achieved that when a control current for switching the switching device 100 is omitted, the switching device 100 automatically changes from the first switching state to the second switching state and thus interrupts the load circuit.

The drive unit 5 alone or with part of the shaft 7 or with the entire shaft 7 can form a drive system that continues to rotate by a predetermined angle after the first switching state is reached. This means that the drive unit 5 or the drive unit 5 and at least part of the shaft 7 or even the drive unit 5 and the shaft 7 can continue to rotate by a predetermined angle when switching to the first switching state after the first switching state has been reached, while the rotary contact bridge 4 is no longer rotated. The predetermined angle may particularly preferably be greater than or equal to 1° and less than or equal to 15°. For example, the attachment of the rotary contact bridge 4 to the shaft 7 can be embodied with a corresponding tolerance or elastically. For example, the pinned fitting 9 can be arranged with a tolerance on the shaft 7 and/or the rotary contact bridge 4. Furthermore, it may also be possible for the pinned fitting 9 to comprise an elastic material. By continuing to rotate the drive system, it can be achieved that the drive system can already perform a rotational motion at the beginning of the switching from the first to the second operating state before the rotary contact bridge 4 and in particular the electrically conductive element 40 of the rotary contact bridge 4 starts to rotate. As a result, the drive system can pick up speed and a rotational pulse can be generated, whereby it can be achieved that the electrically conductive connection between the fixed contacts 2, 3 can be separated more quickly after transmission of this rotational pulse to the rotary contact bridge 4.

The switching device 100 further comprises a switching chamber 11 in which the rotary contact bridge 4 and the fixed contacts 2, 3 are arranged. Thereby, the fixed contacts 2, 3 protrude into the switching chamber 11 through the housing 1 and a switching chamber wall 12 as described above in the general part. In particular, this may mean that at least a part of the contact regions 20, 30 or at least a part of the contact surfaces 21, 31 of each of the fixed contacts 2, 3 may project beyond an inner wall of the switching chamber wall 12 facing the rotary contact bridge 4. In particular, the switching chamber 11 comprises a cylindrical switching chamber wall 12. As shown, the fixed contacts 2, 3 are particularly preferably aligned radially with respect to the rotation axis 99 in the switching chamber wall 12 and preferably face each other in a radial direction.

The switching chamber 11 further comprises a switching chamber base 13, which comprises an opening through which the shaft 7 projects. The drive unit 5 is arranged outside the switching chamber 11. The switching chamber 11, i.e. in particular the switching chamber wall 12 and/or the switching chamber base 13, may at least partially preferably comprise or be made of a metal oxide ceramic such as for example $Al_2O_3$ or a plastic such as for example PEEK, PE, glass-filled PBT or POM. The switching chamber wall 12 and the switching chamber base 13 may also be of different materials. For example, the switching chamber wall 12 is made of a ceramic material, while the switching chamber base 13 is made of a plastic material.

The drive unit 5 is arranged in a pot made of a gas-tight wall 14 below the switching chamber 11. Between the switching chamber 11 and the region with the drive unit 5 arranged therebelow, in the exemplary embodiment shown, a connecting plate 15 is arranged which, like the gas-tight wall 14, may be made of, for example, pure iron, aluminum or stainless steel. As indicated in FIGS. 1B and 1G, the connecting plate 15 may be screwed to the switching chamber 11, for example, while the gas-tight wall 14 may be soldered or welded to the connecting plate 15.

The switching contacts of the switching device 100 are arranged in a gas atmosphere. In particular, the rotary contact bridge 4 is arranged completely in the gas atmosphere, while a part of the fixed contacts 2, 3, such as their contact regions 20, 30, is arranged in the gas atmosphere. For this purpose, the switching device 100 comprises a gas-tight region 16 in which the gas atmosphere is kept hermetically sealed from the environment and in which the described components can be arranged. In the exemplary embodiment shown, the gas-tight region 16 is formed by parts of the switching chamber wall 12, by the gas-tight walls 14 and by the connecting plate 15, wherein a gas-tight wall 14 is additionally provided between the switching chamber wall 12 and the connecting plate 15 in the exemplary embodiment shown. As a result, it may be possible to use a material that is not gas-tight as the switching chamber base 13. The switching device 100 is thus a gas-filled switching device such as a gas-filled contactor. The gas atmosphere, by increasing the are voltage, may in particular promote extinction of arcs that may occur between contacts during switching operations. The gas of the gas atmosphere may preferably comprise $H_2$ and particularly preferably comprise at least 50% $H_2$. In addition to hydrogen, the gas may comprise an inert gas, particularly preferably $N_2$ and/or one or more noble gases.

The gas-tight region 16 is arranged in the housing 1 in the exemplary embodiment shown by means of damping elements 17. The damping elements 17 can be made of an elastic plastic, for example in the form of rubber buffers, and reduce a transmission of mechanical stresses, shocks and vibrations acting on the housing 1 from the housing 1 to the gas-tight region 16 and thus in particular to the switching chamber 11.

As indicated in FIGS. 1E and 1F, the fixed contacts 2, 3 may each comprise a beveled contact surface 21, 31 facing the rotational contact bridge 4 and arranged not tangential to the rotational motion of the rotational contact bridge 4 and thus not tangential to the inner wall of the switching chamber wall 12. In this respect, the contact surfaces 21, 31 can be beveled on one side as shown or alternatively on several sides. By beveling the contact surfaces 21, 31, the mechanical contact to the rotary contact bridge 4 and in particular to the contact pieces 41 can be improved. Furthermore, the contact surfaces 21, 31 can be beveled in such a way that the contact surfaces 21, 31 counteract an undesired rotational motion of the rotary contact bridge 4 in one direction, so that it can be prevented that the rotary contact bridge 4 continues to rotate beyond the first switching state when rotating from the second to the first switching state.

The contact pieces 41 of the rotary contact bridge 4 are particularly preferably spring-mounted. For this purpose, the rotary contact bridge 4 comprises a middle part 42 which is fastened to the shaft 7 and on which the contact pieces 41 are arranged with spring elements 43 arranged therebetween. The contact pieces 41, the middle part 42 and the spring elements 43 substantially form the electrically conductive element 40 and may be formed in one piece or may be formed from separately manufactured parts which are joined together to form the electrically conductive element 40, for example by means of soldering or welding or mechanical joining techniques. As described in the general part, the resilient mounting of the contact pieces 41 in the first switching state can provide increased contact pressure against the contact surfaces 21, 31 and thus a secure mechanical contact.

Preferably, at least the contact pieces 41 and particularly preferably the rotary contact bridge 4 are spaced from the inner wall of the switching chamber wall 12. Preferably, at least the contact pieces 41 and particularly preferably the rotary contact bridge 4 are spaced from the inner wall of the switching chamber wall 12 in any state and also during the switching operations. For example, as can be seen in FIGS. 1A, 1B, 1E, 1F and 1G, the inner wall of the switching chamber wall 12 may comprise a diameter that is larger than the largest dimension of the rotary contact bridge 4 perpendicular to the rotation axis 99. Thus, a gap is present between the rotary contact bridge 4 and the inner wall of the switching chamber wall 12 in the radial direction. The narrower the gap, the easier it is to cause switching arcs occurring during switching to extinguish, since there is less space for the switching arcs to propagate. In particular, it is advantageous if the switching chamber 11 is filled with as much electrically insulating material as possible. In the exemplary embodiment shown, the rotary contact bridge 4 therefore comprises at least one insulator element 44 which comprises or is made of an electrically insulating material. For example, PBT or POM may be used for this purpose.

The electrically conductive element 40 is preferably at least partially surrounded by the insulator element 44. As shown, the rotary contact bridge 4 may be formed substantially by the electrically conductive element 40 and the at least one insulator element 44 as a disc, wherein the contact pieces 41 may protrude in radial direction from the insulator element 44. Particularly preferably, the electrically conductive element 40 is enclosed by the at least one insulator element 44 except for a portion of the contact pieces 41, so that the electrically conductive element 40 is embedded in the at least one insulator element 44. As an alternative to the configuration of the rotary contact bridge 4 as shown in FIGS. 1E and 1F as a substantially circular disk, the insulator material 44 may comprise cutouts, as indicated by the dashed lines as an example. The spring elements 43 and the contact pieces 41 may be arranged in corresponding pockets in the insulator material 44, which provide sufficient space for the spring function.

Further, as shown, the switching device 100 may comprise secondary contacts in the form of auxiliary contacts 18 which, in the second switching state, are electrically conductively connected to each other by the rotary contact bridge 4. In the first switching state, however, the auxiliary contacts 18 are electrically separated from each other. By measuring the electrical resistance, a voltage drop or an auxiliary current flow at the auxiliary contacts 18, it can be determined whether the switching device 100 is in the second switching state or whether, for example, a sticking of the switching contacts has occurred and the rotary contact bridge 4 can no longer rotate from the first to the second switching state. Alternatively, it may also be possible that a further electrically conductive element in the form of an electrically conductive auxiliary element is present in the rotary contact bridge 4, by means of which the auxiliary contacts are electrically conductively connected to one another either in the first or in the second switching state.

The control of the drive unit 5 and, if necessary, the contacting of the auxiliary contacts 18 from the outside can be carried out, for example, by means of a connection element in the housing 1. In FIG. 1I, such a connection element is indicated on the outer side surface of the housing 1.

In the exemplary embodiment shown, the switching device 100 further comprises a magnet 19, in particular a permanent magnet, above each of the fixed contacts 2, 3 along a direction parallel to the rotation axis 99. The magnets 19 are preferably arranged outside the switching chamber 11, for example on the switching chamber 11 or on the outside of the switching chamber 11. By means of the magnets, which act as so-called quenching magnets, a magnetic field can be generated in the region of the fixed contacts 2, 3, which can facilitate quenching of the switching arcs.

The switching device 100 need not necessarily comprise all elements included in the exemplary embodiment shown, such as spring elements, electrically insulating materials, magnets, damping elements or auxiliary contacts. Further, the switching device 100 may comprise a plurality of pairs of fixed contacts, each of which may be interconnected by an associated electrically conductive element in the rotary contact bridge 4.

Figure 2:
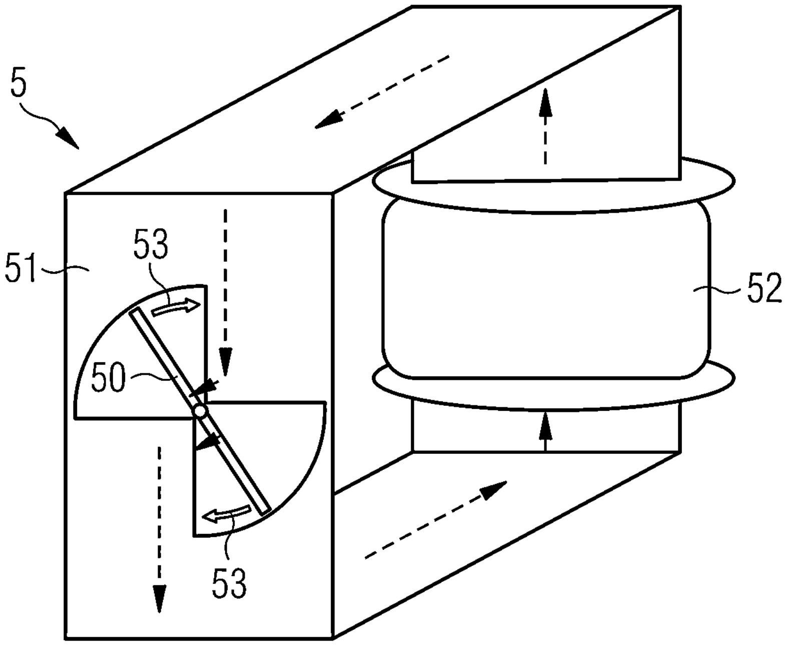
FIG. 2 shows a schematic illustration of a drive unit for a switching device according to an exemplary embodiment.

FIG. 2 shows an exemplary embodiment of a drive unit 5, which is a magnetic drive that can be used as an alternative to a stepper motor described in connection with the previous embodiment. The magnetic drive comprises a rotatable magnetic armature 50, which is rotatable by a magnetic circuit to affect the switching operations described above. For this purpose, the magnetic circuit comprises a yoke 51. The magnetic armature 50 may comprise, or be formed as, a rotary magnetic core which is attached to an end of the shaft opposite the rotary contact bridge and which forms part of the magnetic circuit. The rotatable magnetic armature 50 is thus connected to the rotary contact bridge via the shaft. The yoke 51 and/or the magnetic armature 50 may preferably comprise or be made of pure iron or a low-doped iron alloy. A magnetic field can be generated in the magnetic circuit, indicated by the dashed arrows, by means of a coil 52 which can be connected with a control circuit, and by means of which a rotation 53 of the magnetic armature 51 and thus also of the rotary contact bridge is achieved. The reverse rotation can be achieved, for example, by the return spring described above.

Figure 3A:
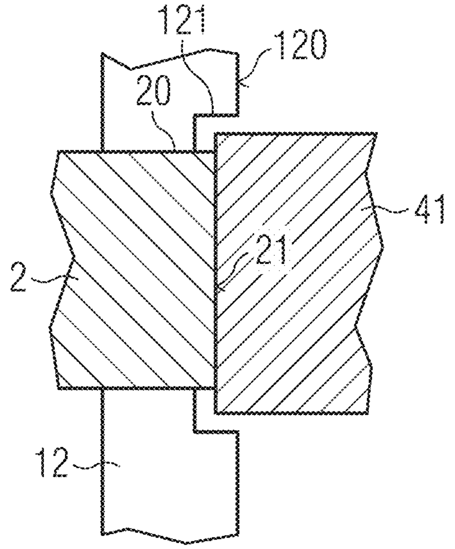
FIGS. 3A and 3B show schematic illustrations of a part of a switching device according to a further exemplary embodiment.
Figure 3B:
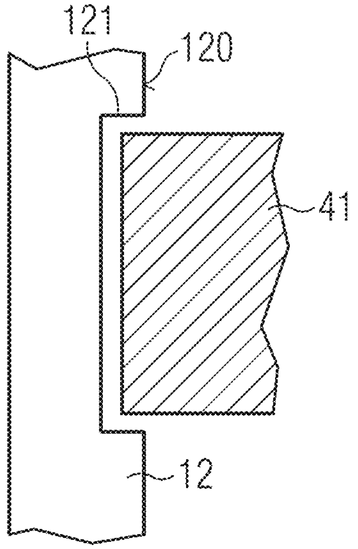

FIGS. 3A and 3B show a part of the switching device 100 according to a further exemplary embodiment. For clarity, only a portion of the switching chamber wall 12 and of a contact piece 41 are shown in FIGS. 3A and 3B in the first switching state in contact with the contact surface 21 of a fixed contact 2 (FIG. 3A) and in the second switching state (FIG. 3B). The switching chamber wall 12 comprises an inner wall 120 facing the rotary contact bridge, which comprises an enlarged diameter at least in the region of the rotary contact bridge. As can be seen, the fixed contacts may be arranged in a groove 121 in the inner wall 120 at least partially surrounding the rotary contact bridge.

The features and exemplary embodiments described in association with the figures can be combined with one another according to further exemplary embodiments, even if not all combinations have been explicitly described. The exemplary embodiments described in association with the figures can furthermore alternatively or additionally have further features according to the description in the general part.

The description based on the exemplary embodiments does not restrict the invention thereto. Instead, the invention comprises any novel feature and any combination of features, which, in particular, includes any combination of features in the claims, even if this feature or this combination itself is not explicitly specified in the claims or exemplary embodiments.

The invention claimed is:

1. A switching device comprising:

two fixed contacts and a rotary contact bridge in a switching chamber in a gas-tight region comprising $H_2$, wherein the rotary contact bridge is rotatable about a rotation axis, wherein the rotary contact bridge comprises an electrically conductive element having two contact pieces on a side facing away from the rotation axis in a radial direction, wherein one of the contact pieces is configured to contact one of the two fixed contacts and another one of the contact pieces is configured to contact another of the two fixed contact, wherein the rotary contact bridge comprises an insulator element and the electrically conductive element is at least partially surrounded by the insulator element, wherein, in a first switching state, the fixed contacts are electrically conductively connected by the rotary contact bridge, and wherein, in a second switching state, the rotary contact bridge is rotatable about the rotation axis relative to the first switching state, and the fixed contacts are electrically insulated from one another.

2. The switching device according to claim 1, wherein the switching chamber comprises a cylindrical switching chamber wall and the fixed contacts project through the switching chamber wall into the switching chamber.

3. The switching device according to claim 2, wherein the switching chamber wall comprises an inner wall facing the rotary contact bridge and the rotary contact bridge is spaced from the inner wall.

4. The switching device according to claim 1, wherein the contact pieces are spring-mounted.

5. The switching device according to claim 1, wherein the insulator element is part of a disc.

6. The switching device according to claim 1, wherein the rotary contact bridge is fixed to a shaft in an electrically insulated manner.

7. The switching device according to claim 1, wherein each of the fixed contacts comprises a beveled contact surface facing the rotary contact bridge.

8. The switching device according to claim 1, further comprising two auxiliary contacts which are electrically conductively connected to each other by the rotary contact bridge in the first or second switching state.

9. The switching device according to claim 1, further comprising a magnet arranged above each of the fixed contacts in a direction parallel to the rotation axis.

10. The switching device according to claim 1, further comprising a driver configured to rotate the rotary contact bridge in order to change a switching state.

11. The switching device according to claim 10, wherein the driver is configured to rotate further by an angle of greater than or equal to 1° and less than or equal to 15° when the first switching state is reached.

12. The switching device according to claim 1, wherein the rotary contact bridge is configured to rotate through an angle of greater than or equal to 10° and less than or equal to 170° when switching between the first and second switching states.

13. The switching device according to claim 1, wherein the gas-tight region comprises $H_2$ with a proportion of at least 50%.

14. A switching device comprising:

two fixed contacts and a rotary contact bridge in a switching chamber in a gas-tight region comprising $H_2$, wherein the rotary contact bridge is rotatable about a rotation axis, wherein, in a first switching state, the fixed contacts are electrically conductively connected by the rotary contact bridge, and wherein, in a second switching state, the rotary contact bridge is rotatable about the rotation axis relative to the first switching state, and the fixed contacts are electrically insulated from one another; and two auxiliary contacts which are electrically conductively connected to each other by the rotary contact bridge in the first or second switching state.

15. The switching device according to claim 14, wherein the switching chamber comprises a cylindrical switching chamber wall and the fixed contacts project through the switching chamber wall into the switching chamber.

16. The switching device according to claim 15, wherein the switching chamber wall comprises an inner wall facing the rotary contact bridge and the rotary contact bridge is spaced from the inner wall.

17. The switching device according to claim 14, wherein the rotary contact bridge comprises an electrically conductive element having two contact pieces on a side facing away from the rotation axis in a radial direction, wherein one of the contact pieces is configured to contact one of the two fixed contacts and another one of the contact pieces is configured to contact another of the two fixed contacts.

18. The switching device according to claim 17, wherein the contact pieces are spring-mounted.

19. The switching device according to claim 17, wherein the rotary contact bridge comprises an insulator element and the electrically conductive element is at least partially surrounded by the insulator element.

20. A switching device comprising:

two fixed contacts and a rotary contact bridge in a switching chamber, wherein the rotary contact bridge is rotatable about a rotation axis, wherein, in a first switching state, the fixed contacts are electrically conductively connected by the rotary contact bridge, and wherein, in a second switching state, the rotary contact bridge is rotatable about the rotation axis relative to the first switching state, and the fixed contacts are electrically insulated from one another; and two auxiliary contacts which are electrically conductively connected to each other by the rotary contact bridge in the first or second switching state; or wherein the rotary contact bridge comprises an electrically conductive element having two contact pieces on a side facing away from the rotation axis in a radial direction, wherein one of the contact pieces is configured to contact one of the two fixed contacts and another one of the contact pieces is configured to contact another of the two fixed contact, and wherein the rotary contact bridge comprises an insulator element and the electrically conductive element is at least partially surrounded by the insulator element.

* * * * *